US009658488B2

(12) United States Patent
Chen et al.

(10) Patent No.: US 9,658,488 B2
(45) Date of Patent: May 23, 2017

(54) BACKLIGHT MODULE WITH PARTIALLY OVERLAPPED FILM DESIGN

(71) Applicant: AU OPTRONICS CORPORATION, Hsin-Chu (TW)

(72) Inventors: Chung-Ting Chen, Hsin-Chu (TW); Wei-Chun Chung, Hsin-Chu (TW); Ming-Cheng Wang, Hsin-Chu (TW); Shih-Fu Tseng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 14/830,907

(22) Filed: Aug. 20, 2015

(65) Prior Publication Data

US 2016/0076734 A1    Mar. 17, 2016

(30) Foreign Application Priority Data

Sep. 11, 2014   (TW) .............................. 103131271 A

(51) Int. Cl.
*F21V 7/22*       (2006.01)
*G02F 1/1335*  (2006.01)

(52) U.S. Cl.
CPC .............................. *G02F 1/133606* (2013.01)

(58) Field of Classification Search
CPC ................................................ G02F 1/133606
See application file for complete search history.

(56) References Cited

U.S. PATENT DOCUMENTS

| 7,658,504 B2 * | 2/2010 | Moriyasu .......... G02F 1/133603 349/69 |
| 8,587,747 B2 | 11/2013 | Kim |
| 9,348,085 B2 * | 5/2016 | Chien .................. G02B 6/0096 |
| 2010/0045897 A1 | 2/2010 | Kim et al. |
| 2015/0021634 A1 * | 1/2015 | Ishihara .............. H01L 25/0753 257/88 |

FOREIGN PATENT DOCUMENTS

| CN | 201284989 Y | 8/2009 |
| CN | 202660409 U | 1/2013 |
| TW | 201009457 A1 | 3/2010 |

OTHER PUBLICATIONS

Office Action issued in corresponding Taiwan patent application on Dec. 24, 2015.

* cited by examiner

*Primary Examiner* — Thomas M Sember
(74) *Attorney, Agent, or Firm* — McClure, Qualey & Rodack, LLP

(57) ABSTRACT

The present invention provides a backlight module, comprising a light source module and an optical control layer disposed on the light source module. The optical control layer comprises a first optical film and a second optical film. The first optical film has a first overlap area on a first side, the first overlap area comprises first inner openings; the second optical film comprises a second overlap area near the first overlap area. The second overlap area matches the first overlap area. The second overlap area comprises second outer openings corresponding to the first inner openings.

12 Claims, 10 Drawing Sheets

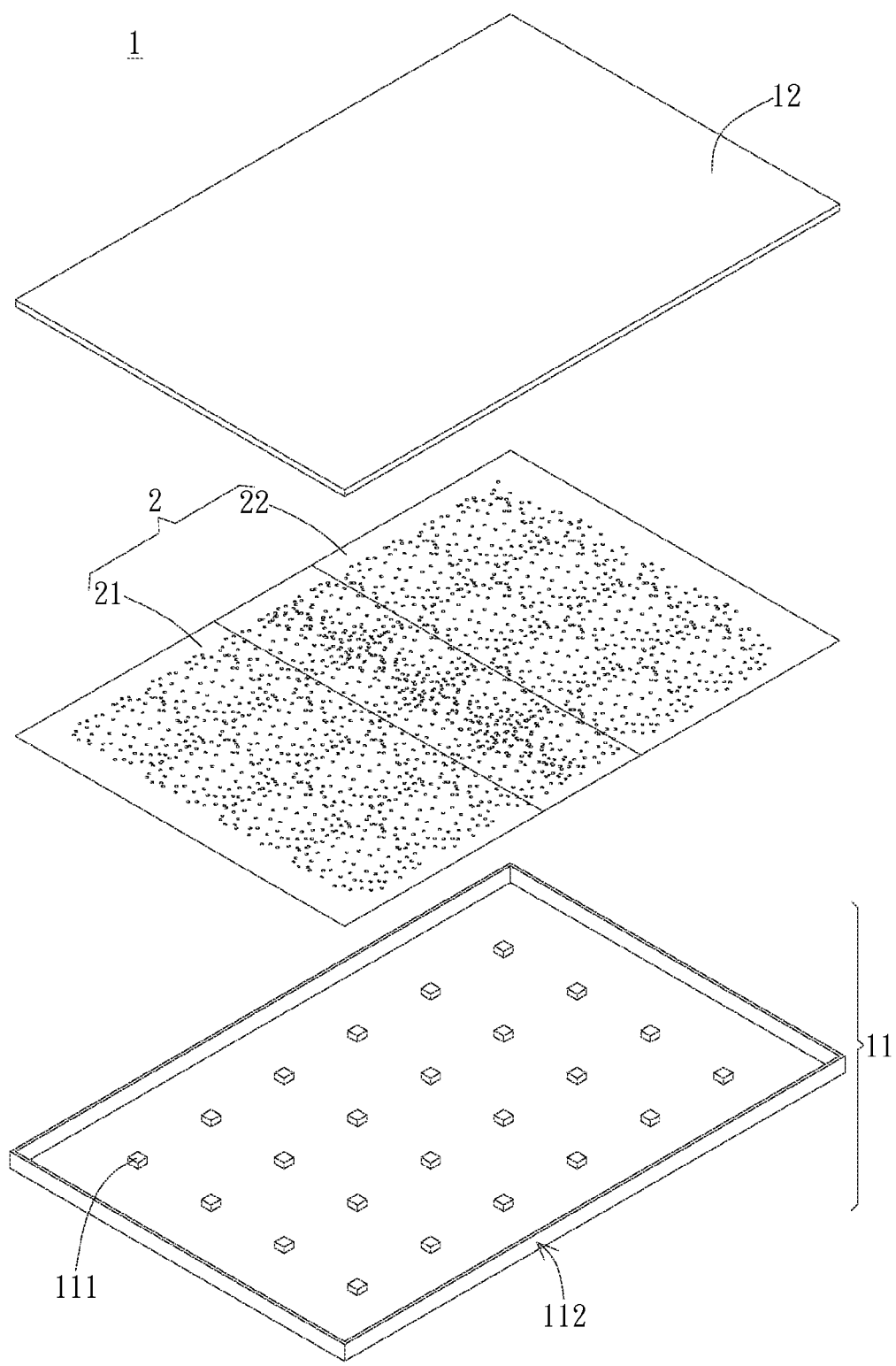
FIG. 2A (EXPLODED VIEW)

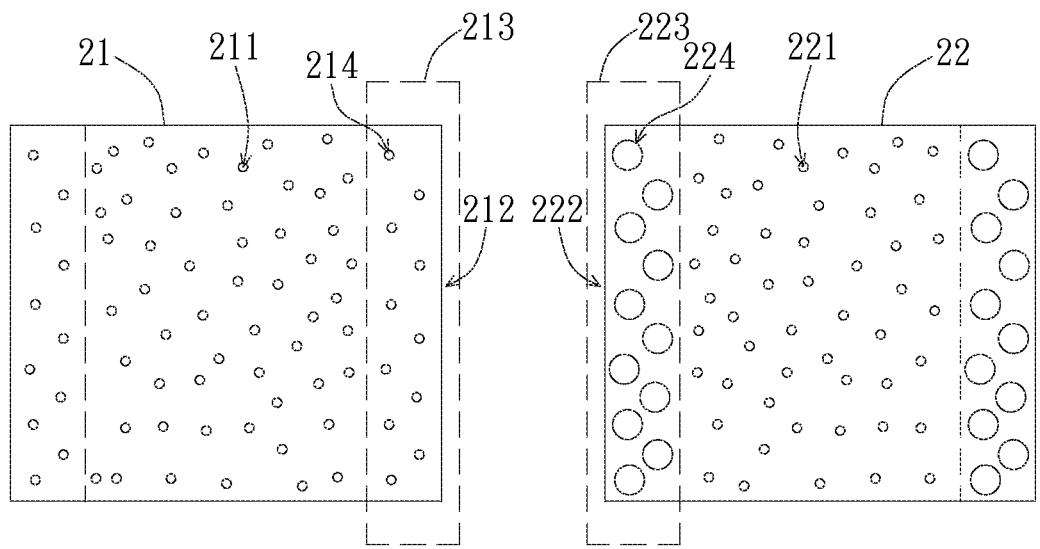
FIG. 2B (TOP VIEW)
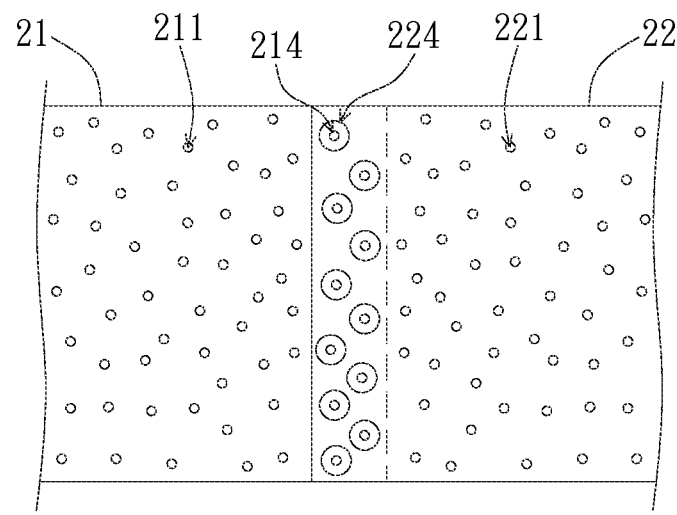
FIG. 2C (TOP VIEW)

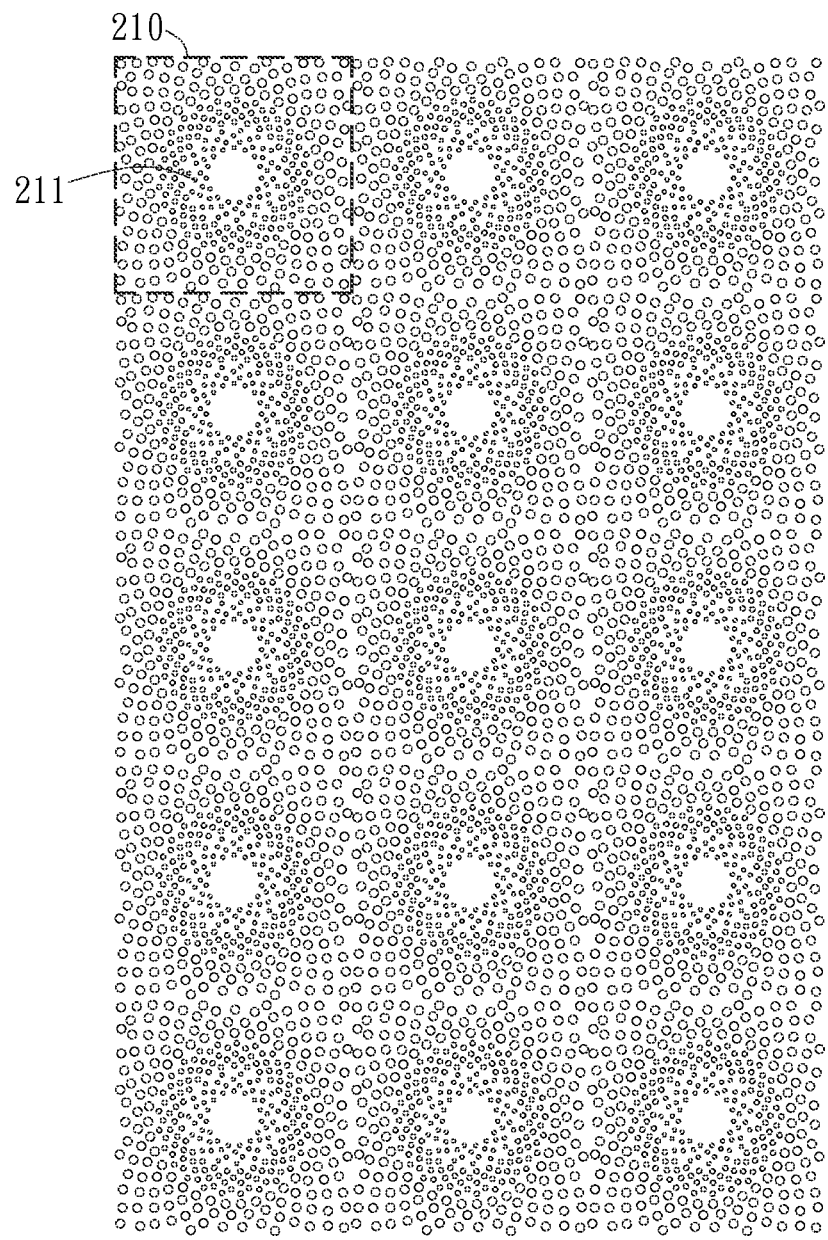
FIG. 2D (TOP VIEW)

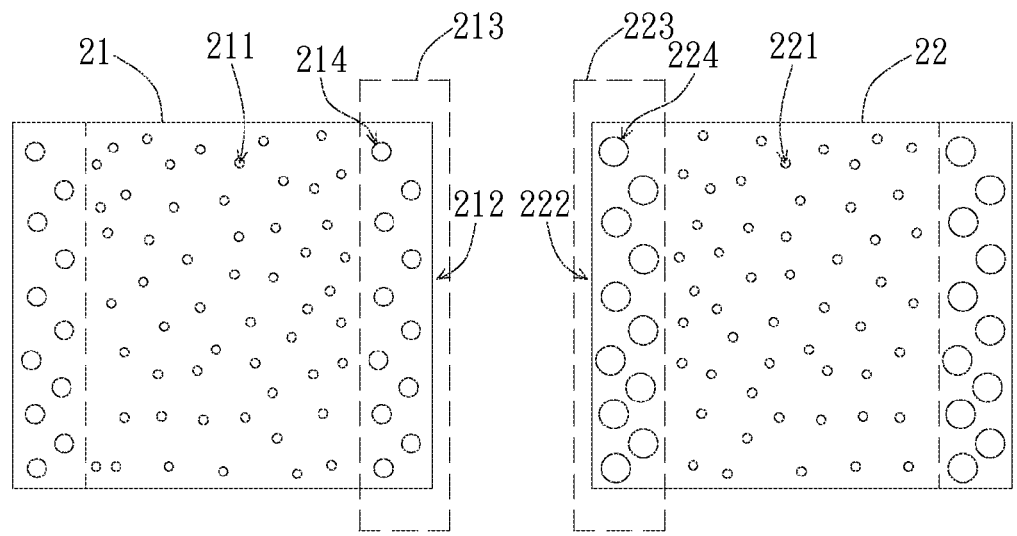
FIG. 2E (TOP VIEW)
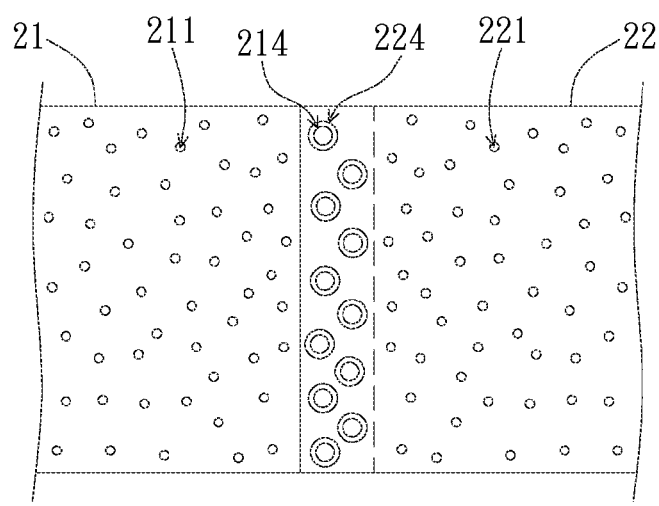
FIG. 2F (TOP VIEW)

BACKLIGHT MODULE WITH PARTIALLY OVERLAPPED FILM DESIGN

BACKGROUND OF THE INVENTION

1. Field of the Invention

The present invention is related a backlight module, especially a direct type backlight module with partially overlapped film.

2. Description of the Prior Art

FIG. 1A is a schematic diagram of a conventional direct type backlight module 1, comprising a light source module 11 and reflector 2. The light source module 11 comprises a plurality of light sources 111. The reflector 2 comprises a first reflector 21 and a second reflector 22 both disposed on the light source module 11 for distributing the light generated from the light sources 111. However, when designing the large size module, because of the limited length of the reflector so that the factory cannot supply one single large size reflector, it must be finished by jointing multiple reflectors. Nevertheless, the overlapped area of two reflectors could occur bright/dark joint marks and leads to bad display quality.

The conventional way to joint multiple reflectors comprises: one example is shown in FIG. 1 B, using double-sided tape to adhesive first reflector 21 and second reflector 22; another example is shown in FIG. 1C, adjusting the range of overlapped area of first reflector 21 and second reflector 22, e.g. shortening the width of the overlapped area. However, the bright/dark joint marks cannot be completely avoided.

SUMMARY OF THE INVENTION

In view of the above problems, in one aspect, the present invention provides a backlight module improving optical behavior of the overlapped area of films.

In another aspect, the present invention provides a backlight module reducing the uneven status of the overlapped area of films.

The backlight module comprises a light source module and an optical control layer. The light source module comprises at least one light source; the optical control layer disposed on the light source module is configured to distribute light generated from the light source to emit through different positions. The optical control layer comprises a first optical film and second optical film. The first optical film comprises a plurality of first light exit openings; wherein the first optical film has a first overlap area on a first side, the first overlap area has at least one first inner opening. The second optical film comprises a plurality of second light exit openings continuously disposed on the first side of the first optical film. A second side of the second optical film adjacent to the first optical film has a second overlap area overlapped with the first overlap area, the second overlap area has at least one second outer opening corresponding to the first inner opening. An opening edge of the second outer opening is around an opening edge of the first inner opening out of a project position on the second optical film.

Compared with the conventional technique, the backlight module of the invention can improve the transmittance of the overlapped area so that light can emit through the overlapped area of two optical films when jointing the optical films; or avoid light loss as a result of the increased thickness of the overlapped area so that the bright/dark joint marks can be avoided. In practice, it can improve the display quality.

BRIEF DESCRIPTION OF THE DRAWINGS

FIG. 2A is an exploded view of a backlight module in an embodiment.

FIG. 2B and 2C are top views of an optical control layer in an embodiment.

FIG. 2D-2F are top views of an optical control layer in another embodiment.

DETAILED DESCRIPTION OF THE PREFERRED EMBODIMENT

Figure 1A:
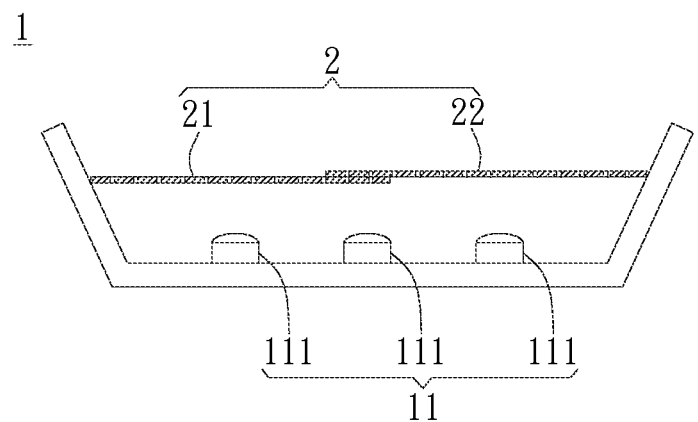
FIG. 1A is a schematic diagram of a conventional direct type backlight module.
Figure 1B:
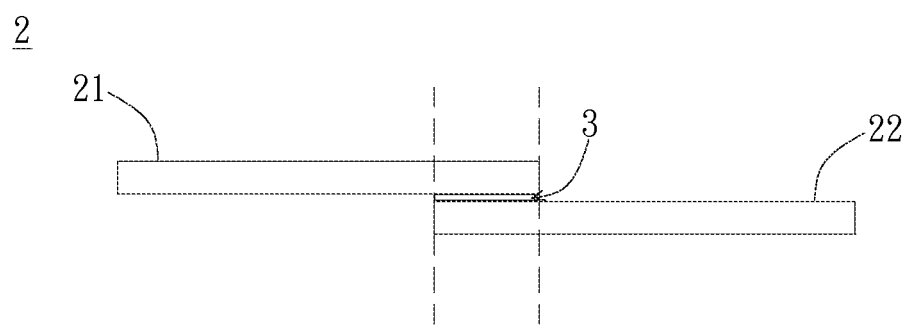
FIG. 1B-FIG. 1E are schematic diagrams of conventional way to joint reflectors.
Figure 1C:
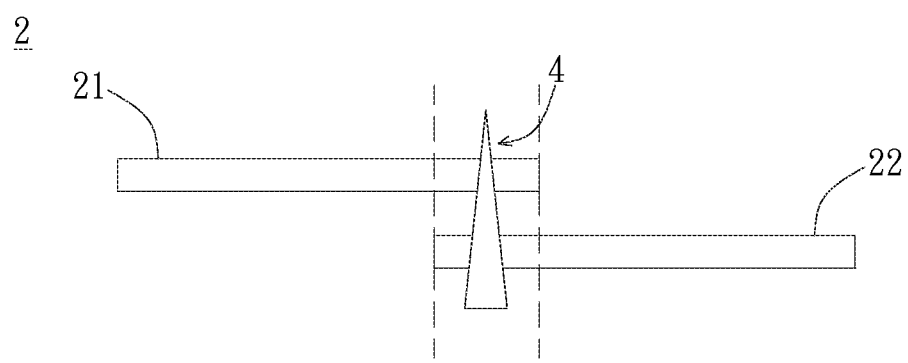
Figure 1D:
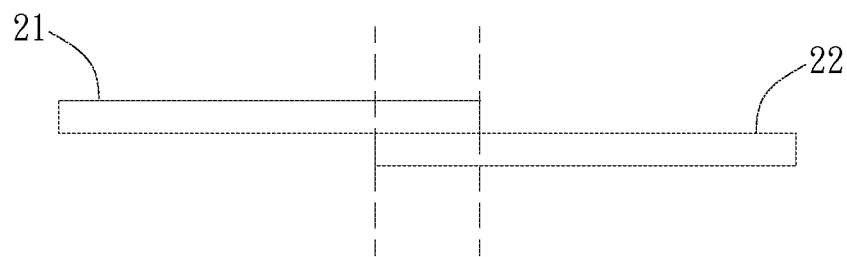
Figure 1E:
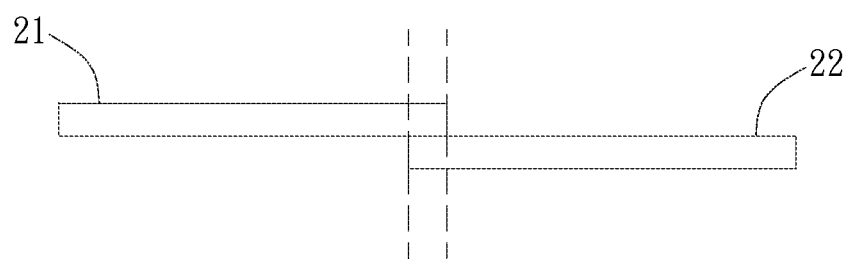

Please refer to FIG. 2A, FIG. 2A is an exploded view of a backlight module in an embodiment. A backlight module 1 preferably comprises a light source module 11 and an optical control layer 2. The light source module 11 comprises a plurality of light sources 111 (e.g. light-emitting diode, LED); furthermore, the light source module 11 preferably comprises a supporting plate 112 to support the light sources 111. The optical control layer 2 is disposed on the light source module, is configured to distribute light generated from the light sources 111 to emit through different positions. The optical control layer 2 preferably comprises multiple optical films. The multiple optical films preferably are high reflectance porous reflectors with multiple light exit openings. The light generated from light sources 111 can reflect back and forth by the optical control layer 2 and the supporting plate 112, and emit out of the optical control layer 2 from the light exit openings. Accordingly, by adjusting different positions density and sizes of the light exit openings on the optical control layer 2 to change unit opening area ratio on different positions to distribute the light generated from light sources 111. In addition, a diffuser 12 can set on the optical control layer 2 for further uniforming the light emitted from the optical control layer 2.

Please refer to FIG. 2B, in this embodiment, the optical control layer 2 comprises a first optical film 21 and a second optical film 22, but not limited thereto. The first optical film 21 has a plurality of first light exit openings 211 for light emitting. The first optical film 21 has a first overlap area 213 on a first side 212, and the first overlap area 213 has a plurality of first inner openings 214. In a preferable embodiment, the first inner openings 214 can distribute and emit light. The second optical film 22 is disposed close to the first side 212 of the first optical film 21 and is preferably parallel to the first optical film 21. The second optical film 22 has a plurality of second light exit openings 221. The second optical film 22 has a second side 222 close to the first side 212 of the first optical film 21. The second side 222 has a second overlap area 223 with a plurality of second outer openings 224. In a preferable embodiment, the second outer openings 224 can also distribute and emit light. In the embodiment, the first inner openings 214 and the second outer openings 224 are the same shape of circle, and the diameters of the second outer openings 224 are larger than the diameters of the first inner openings 214, but not limited thereto. In other embodiments, the shape could be different. It is noted that the area of the first inner openings 214 is smaller than the area of the second outer openings 224.

Please refer to FIG. 2C, FIG. 2C is a top view of an optical control layer in an embodiment. The first overlap area 213 of the first optical film 21 and the second overlap area 223 of the second optical film 22 are overlapped with each other. The first inner openings 214 of the first overlap area 213 are corresponding to the second outer openings 224 of the second overlap area 223. In FIG. 2C, the opening edge of the second outer opening 224 is around the opening edge of the first inner opening 214 out of a project position on the second optical film 22. Accordingly, the light can emit through the first inner opening 214 and the second outer opening 224. Furthermore, if the thermal expansion generated during manufacturing or assembling or errors during constructing, the first inner opening 214 is still located in the second outer opening 224. In the embodiment, the edges of the first inner opening 214 and the second outer opening 224 can be fastened by taper fasteners, preferably are the transparent fasteners. However, in other embodiment, it can be designed to set double-sided tapes between the overlapped area without openings to strengthen the first optical film 21 and the second optical film 22.

Referring to FIG. 2D, FIG. 2D is another embodiment in top view of the first optical film 21. In the embodiment, the first optical film 21 has a plurality of blocks 210 respectively corresponding to each light source 111. In regard to a preferable embodiment, the first light exit openings 211 are distributed equally, similarly, or in high level relativity in each block 210. In each block 210, the unit opening area ratio of the first light exit openings 211 is taken as center corresponding to the project positions of the light sources, and change increasingly with a first function value by default toward the outside of the block 210. The unit opening area ratio preferably refers to the ratio of the light exit opening area in single unit area. That is, the unit opening area ratio is preferably a standardized ratio value without unit. In other words, the default first function value preferably increase gradually with the increased distance by the project position of the light source. The default first function value preferably is an exponential function or polynomial function, e.g. quadratic or cubic polynomial functions, but not limited thereto. Take the quadratic polynomial function as an example, the default function value can be:

$$f(x)=ax^2+bx+c$$

wherein x is the distance between each position and the project position of the light source in the block 210; f(x) can be the unit opening area ratio or multiplied by a parameter of the position. Accordingly, the final backlight can be more uniform.

In the above embodiment, the opening ratios of the first light exit opening 211 and the first inner opening 214 are equal. In other words, with respect to the same distance x, the first light exit opening 211 and the first inner opening 214 have equal opening ratio. However, in other embodiments, the opening ratio of the first inner opening 214 can larger than the opening ratio of the first light exit opening 211. For example, as shown in FIG. 2E and FIG. 2F, FIG. 2E and FIG. 2F are top views of an optical control layer. The openings close to the overlapped area, that is, the first inner openings disposed on the first overlap area 213, the unit opening area ratio preferably is a little larger than the first light exit openings 211. If the unit opening area ratio of the first light exit opening 211 taken as center closing to project position of the light source change with the first function value, then the unit opening area ratio of the first inner opening 214 taken as center closing to project position of the light source change with the first function value multiplied by a weighted value, wherein the weighted value is between 1.1-1.3. In short, compared with the first light exit opening 211, the unit opening area ratio of the first inner opening 214 increases about 10%-30%. The unit opening area ratio can be implemented by changing opening size and increasing opening density. In the embodiment, when the first inner openings 214 of the first overlap area 213 correspond to the second outer openings 224 of the second overlap area 223, the openings area are determined by the first inner openings 214 which are located inside. Accordingly, this design can further reduce the dark area occurred by overlapping the first overlap area 213 and the second overlap area 223.

Figure 3A:
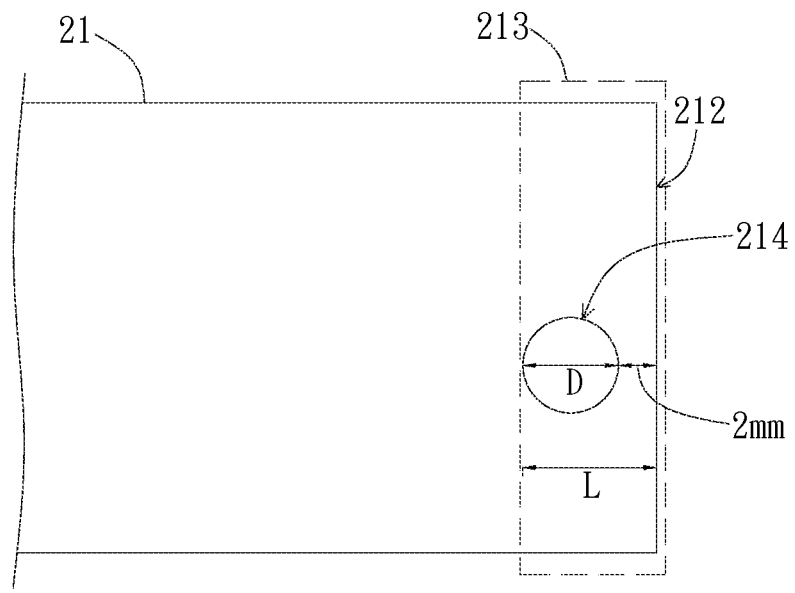
FIG. 3A-3C are schematic diagrams of an optical control layer in another embodiment.
Figure 3B:
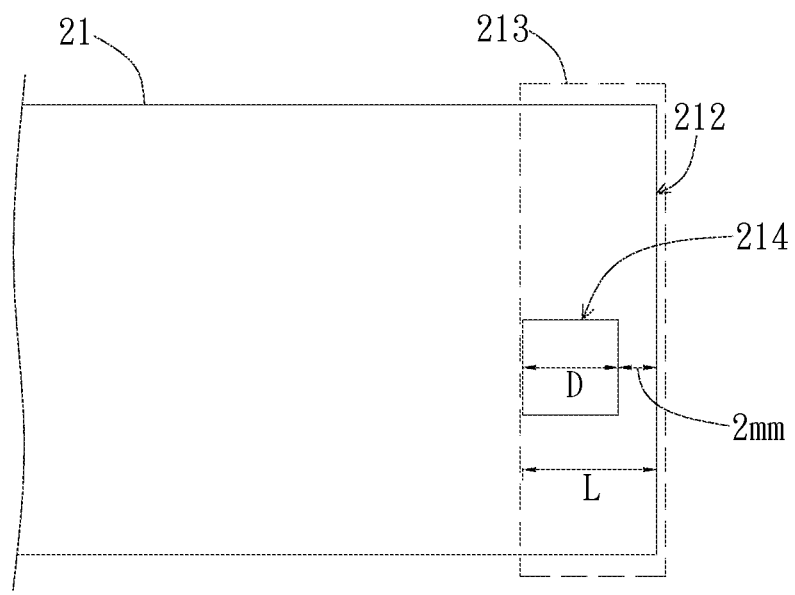

In addition, to avoid the distance between the first inner opening 214 and the first side 212 of the first optical film 21 is oversize and results in the bright/dark joint mark, it preferably limit the width of the overlap area. Please refer to FIG. 3, take the first optical film 21 as an example, the diameter of the first inner opening 214 disposed in the cross direction a of the first side 212 on the first overlap area 213 is D, and the width of the first overlap area 213 is L. Then the preferable design is the width L in cross direction of the first overlap area 213 minus the diameter D of the first inner opening 214 is less than 2 mm, that is, L−D≤2 mm. In addition, as shown in FIG. 3B, if the first inner openings 214 are different shapes, e.g. rectangle, then the width L of the first overlap area 213 is designed that the width L in cross direction of the first overlap area 213 minus the largest width D of the first inner opening 214 is less than 2 mm.

Figure 3C:
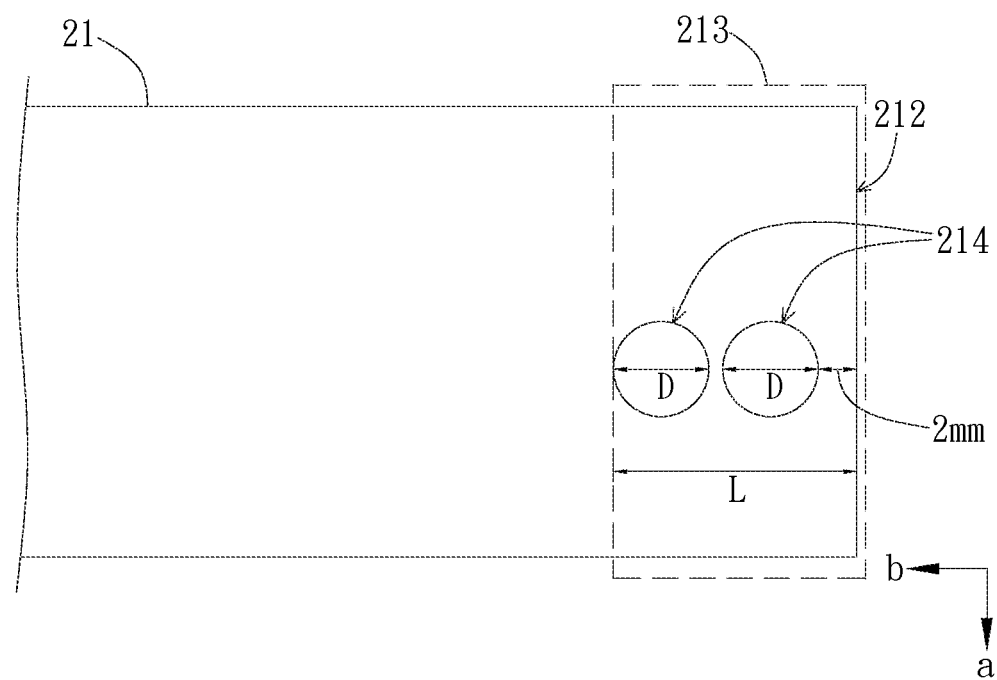

It is noted that if there are N first inner openings 214 disposed on the first overlap area 213, then the width L in cross direction a of the first overlap area 213 minus the sum of diameter D of N first inner openings is less than 2 mm. The embodiment shown in FIG. 3C is N=2. In short, the distance between the edge of the first inner opening 214 which is the most close to the first side 212 and the first side 212 is less than 2 mm.

Figure 4A:
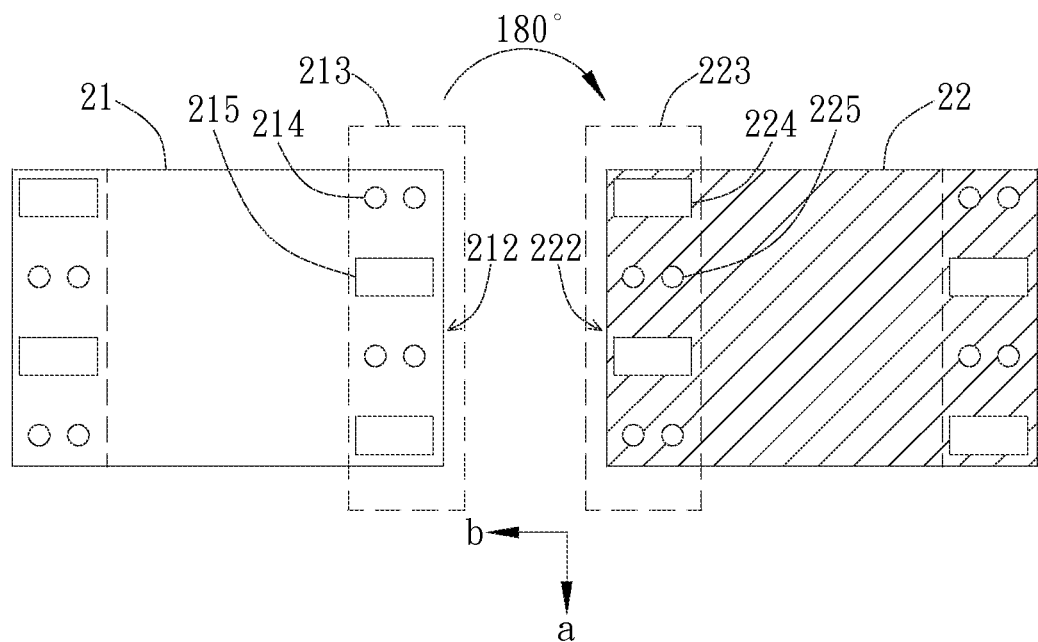
FIG. 4A and FIG. 4B are schematic diagrams of an optical control layer in another embodiment.
Figure 4B:
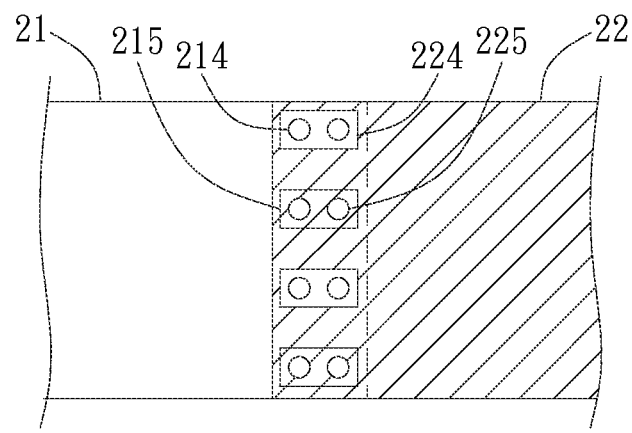

Another embodiment in the invention, please refer to FIG. 4A and FIG. 4B. The first side 212 of the first optical film 21 has a first overlap area 213. The first overlap area 213 has a plurality of first inner openings 214 and a plurality of first outer openings 215 both disposed along the cross direction of a the first side 212. The first inner openings 214 and the first outer openings 215 are disposed in an interlaced manner along the first side 212. In the embodiment, the first inner openings 214 are in the shape of circle, but not limited thereto. The side of second optical film 22 adjacent to the first optical film 21, that is, the second side 212 has a second overlap area 223. The second overlap area 223 has a plurality of second inner openings 225 and a plurality of second outer openings 224 both disposed in an interlaced manner. The second inner openings 225 and the second outer openings 224 are disposed along the cross direction a. In this embodiment, the second outer openings 224 are disposed along the cross direction a in a long-distribution such that the second outer openings 224 can contain the first inner openings 214. Similarly, the first outer openings 215 contain the second inner openings 225. It is noted that the first optical film 21 spins 180 degrees along the same plane becomes the second optical film 22. The first inner openings 214 correspond to the second outer openings 224, and the first outer openings 215 correspond to the second inner openings 225. As shown in the figures, the first inner openings 214 and the first outer openings 215 of the first optical film 21 spin 180 degrees have the same distribution as the second inner openings 225 and the second outer openings 224 of the second optical film 22. In practice, we can use the second optical film to joint with the first optical film when the first optical film is completed and spin it 180 degrees. Therefore, we can complete multiple optical films with the same process. Accordingly, this design can reduce the cost.

Please refer to FIG. 4B, the first overlap area and the second overlap area are overlapped. The projection positions of the first inner openings 214 of the first overlap area projected on the second optical film 22 fall into the second outer openings 224. The range of the second outer opening 224 contains the range of the first inner opening 214, and the first outer opening 215 contains the range of the second inner opening 225. The opening edge of the first outer opening 215 is around the opening edge of the second inner opening 225 out of the project position on the first optical film 21. By this design, because one outer opening can correspond to multiple inner openings simultaneously, the difficulty and time of aligning will be reduced.

Figure 5A:
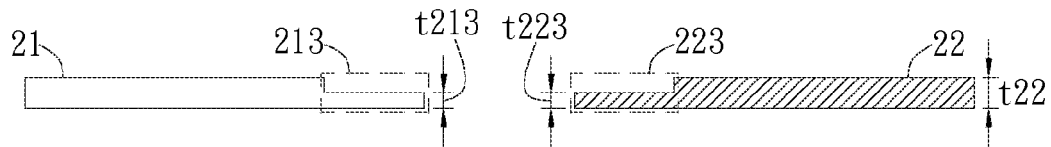
FIG. 5A is a schematic diagram of an optical control layer in another embodiment.
Figure 5B:
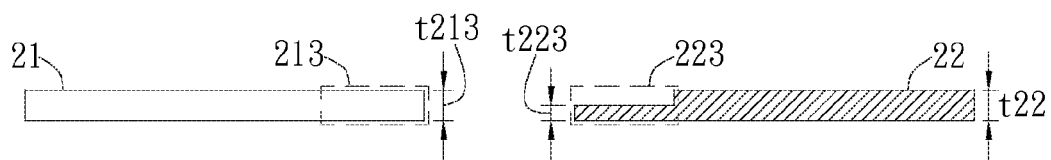
FIG. 5B is a schematic diagram of an optical control layer in another embodiment.
Figure 5C:
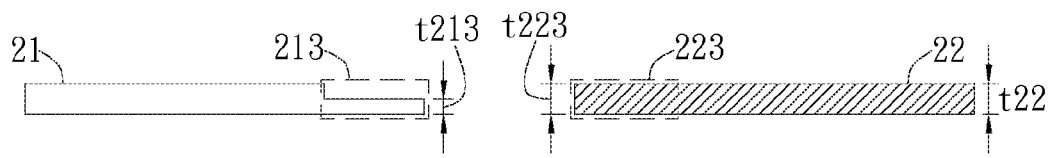
FIG. 5C is a schematic diagram of an optical control layer in another embodiment.

Another embodiment in this invention, as shown in FIG. 5A. In practice, the thickness t213 of the first overlap area 213 and the thickness t223 of the second overlap area 223 are both thinner than the largest thickness t22 of the second optical film 22. For example, non-second overlap area 213 region, that is, t213 and t223 are both thinner than t22. Similarly, the thickness t213 of the first overlap area 213 and the thickness t223 of the second overlap area 223 are both thinner than the largest thickness of the first optical film. In practice, the thicknesses of the first optical film and the second optical film are almost equal. However, they may be designed in different thickness by needed. In a preferable embodiment, as shown in FIG. 5B, it can be designed that only the thickness t223 of the second overlap area 223 is thinner than the thickness t22 of non-second overlap area 223 region of the second optical film 22, that is, t223<t22. In another preferable embodiment, as shown in FIG. 5C, only the thickness t213 of the first overlap area 213 is thinner than the thickness t22 of non-second overlap area 223 region of the second optical film 22, that is, t213<t22. It is noted that the first overlap area 213 or the second overlap area 223 described above are dug in a top-down direction to be thin, but not limited thereto. The ways to overlap and fasten are modified corresponding to the aforementioned different embodiments.

Figure 5D:
FIG. 5D is a schematic diagram of an optical control layer in another embodiment.
Figure 5E:
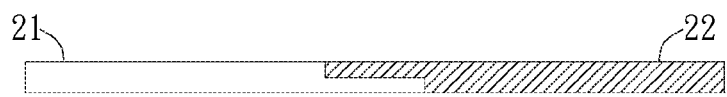
FIG. 5E is a combination diagram of an optical control layer in the embodiment of FIG. 5D.

Certainly, to make the optical control film 2 more uniform, in practice, in the preferable embodiment it can be designed that the thickness of overlapped area of the first overlap area 213 and the second overlap area 223 is equal to the thickness of the first optical film 21 and the second optical film 22. As shown in FIG. 5D and FIG. 5E, the first overlap area 213 is dug in a top-down direction to make the thickness be thinner than the thickness of non-first overlap area 213 region of the first optical film 21. The second overlap area 223 is dug in a top-down direction to make the thickness be thinner than the thickness of non-second overlap area 223 region of the second optical film 22. After overlapping two optical films, the dug regions are complementary to make thickness of the first optical film 21 and of the second optical film 22 are the same after overlapping. It is noted that the digging direction is only an example in the embodiment, but not limited thereto. Therefore, when the optical films are overlapped, by reducing the overlap areas of the first overlap area 213 and/or of the second overlap area 223 to increase the transmittance through the overlapped area of the two optical films.

Compared with the conventional technique, the backlight module of the invention can improve the transmittance of the overlapped area so that light can emit through the overlapped area of two optical films when jointing the optical films; or avoid light loss as a result of the increased thickness of the overlapped area so that the bright/dark joint marks can be avoided. In practice, it can improve the display quality.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A backlight module, comprising:
   a light source module, comprising at least one light source;
   an optical control layer disposed on the light source module, is configured to distribute light generated from the light source to emit through different positions; the optical control layer comprises:
   a first optical film comprises a plurality of first light exit openings; wherein the first optical film has a first overlap area on a first side, the first overlap area has at least one first inner opening; and
   a second optical film comprises a plurality of second light exit openings continuously disposed on the first side of the first optical film; wherein a second side of the second optical film adjacent to the first optical film has a second overlap area overlapped with the first overlap area, the second overlap area has at least one second outer opening corresponding to the first inner opening;
   wherein an opening edge of the second outer opening is around an opening edge of the first inner opening out of a project position on the second optical film.

2. The backlight module of claim 1, wherein unit opening area ratio of the plurality of first light exit openings taken as center closing to project position of the light source change with a first function value; in area overlapped of the first overlap area and the second overlap area, the unit opening area ratio with overlapping by the first inner opening and the second outer opening taken as center closing to project position of the light source change with the first function value multiplied by a weighted value, the weighted value is between 1.1-1.3.

3. The backlight module of claim 1, wherein the first inner opening is circle, the second outer opening is rectangle.

4. The backlight module of claim 1, wherein the first inner opening is smaller than the second outer opening.

5. The backlight module of claim 1, further comprising a fastener for fastening the opening edges of the first inner opening and the second outer opening.

6. The backlight module of claim 1, wherein multiple of the first inner opening projected on the second optical film fall into the same second outer opening.

7. The backlight module of claim 6, wherein multiple of the first inner openings are disposed along cross direction of the first side, the second outer openings are disposed along the cross direction in a long-distribution to contain the first inner openings.

8. The backlight module of claim 1, wherein the first overlap area has at least one first outer opening, the second overlap area has at least one second inner opening corresponding to the first outer opening; an opening edge of the first outer opening is around an opening edge of the second inner opening out of a project position on the first optical film.

9. The backlight module of claim 8, wherein the first inner opening and the first outer opening are disposed along the first side in an interlaced manner.

10. The backlight module of claim 9, wherein the first inner openings and the first outer openings disposed on the first optical film have the same distribution as the second inner openings and the second outer openings disposed on the second optical film after the first optical film are spun 180 degrees along the same plane.

11. The backlight module of claim 1, wherein the thickness of the first overlap area and/or the thickness of the second overlap area are thinner than the thickness of the second optical film.

12. The backlight module of claim 1, wherein the overlapped thickness of the first overlap area and the second overlap area is the same as the thickness of the first optical film and the thickness of the second optical film.

* * * * *